(12) United States Patent
Nishizawa et al.

(10) Patent No.: US 6,169,047 B1
(45) Date of Patent: Jan. 2, 2001

(54) ALKALI-FREE GLASS AND FLAT PANEL DISPLAY

(75) Inventors: Manabu Nishizawa; Yasumasa Nakao, both of Yokohama (JP)

(73) Assignee: Asahi Glass Company Ltd., Tokyo (JP)

(*) Notice: Under 35 U.S.C. 154(b), the term of this patent shall be extended for 0 days.

(21) Appl. No.: 09/268,319

(22) Filed: Mar. 16, 1999

Related U.S. Application Data

(63) Continuation-in-part of application No. 08/867,958, filed on Jun. 3, 1997, now abandoned, which is a continuation-in-part of application No. 08/669,797, filed on Jun. 27, 1996, now Pat. No. 5,801,109, which is a continuation of application No. 08/563,824, filed on Nov. 28, 1995, now abandoned.

(30) Foreign Application Priority Data

Nov. 30, 1994 (JP) .................................................... 6-296522
Oct. 20, 1995 (JP) .................................................... 7-273234
Jun. 3, 1996 (JP) .................................................... 8-140305

(51) Int. Cl.[7] ............................. C03C 3/091; C03C 3/085

(52) U.S. Cl. ................................. 501/66; 501/69; 501/70; 428/428

(58) Field of Search ................................. 501/66, 69, 70; 428/428

(56) References Cited

U.S. PATENT DOCUMENTS

| | | |
|---|---|---|
| 5,244,847 | 9/1993 | Kushitani et al. . |
| 5,348,916 | 9/1994 | Kushitani et al. . |
| 5,801,109 | 9/1998 | Nishizawa et al. . |
| 5,885,914 | 3/1999 | Nishizawa et al. . |

FOREIGN PATENT DOCUMENTS

| | | |
|---|---|---|
| 9-169538 | 6/1997 | (JP) . |
| 9-169539 | 6/1997 | (JP) . |
| 10-72237 | 3/1998 | (JP) . |

*Primary Examiner*—Karl Group
(74) *Attorney, Agent, or Firm*—Oblon, Spivak, McClelland, Maier & Neustadt, P.C.

(57) ABSTRACT

An alkali-free glass consisting essentially of, by wt %, from 58.4 to 66.0% of $SiO_2$, from 15.3 to 22.0% of $Al_2O_3$, from 5.0 to 12.0% of $B_2O_3$, from 0 to 8.0% of MgO, from 0 to 9.0% of CaO, from 3.0 to 12.5% of SrO, from 0 to less than 2.0% of BaO, and from 9.0 to 18.0% of MgO+CaO+SrO+BaO and having a strain point of at least 640° C.

19 Claims, No Drawings

ALKALI-FREE GLASS AND FLAT PANEL DISPLAY

CROSS-REFERENCE TO RELATED APPLICATION

This application is a Continuation-in-part (CIP) of application Ser. No. 08/867,958 filed on Jun. 3, 1997, now abandoned which is a Continuation-In-Part of Ser. No. 08/669,797 filed Jun. 27, 1996, now U.S. Pat. No. 5,801,109, which is a a continuation of Ser. No. 08/563,824 filed Nov. 28, 1995, abandoned.

BACKGROUND OF THE INVENTION

1. Field of the Invention

The present invention relates to alkali-free glasses which are suitable as substrate glasses for various displays or photomasks and which are essentially free from alkali metal oxides and can be formed by float process, and flat panel displays employing them.

2. Discussion of Background

Heretofore, the following properties have been required for substrate glasses for various displays, particularly for the ones intended to form a thin film of a metal or oxide on their surface.

(1) They are essentially free from alkali metal oxides. If an alkali metal oxide is contained, the alkali metal ion tends to diffuse in the thin film, whereby the film properties will deteriorate.

(2) They have high strain points, so that when they are exposed to a high temperature during the process for forming a thin film, deformation of the glass and shrinkage due to stabilization of the glass structure are suppressed to the minimum levels.

(3) They have adequate chemical durability against various reagents to be used for forming semiconductors. Particularly, they have durability against hydrofluoric acid used for etching $SiO_x$ or $SiN_x$ or against a buffered hydrofluoric acid (BHF) containing ammonium fluoride and hydrofluoric acid as the main components.

(4) They have no internal or surface defects (such as bubbles, striae, inclusions, pits or scratch marks).

Heretofore, Corning code 7059 glass is widely employed as a substrate glass for various displays or photomasks. However, this glass has the following deficiencies for displays.

(1) The strain point is as low as 593° C., and preliminary heat treatment to reduce the shrinkage of glass has to be carried out prior to a process for preparing the displays.

(2) The amount of elution into hydrochloric acid used for etching a metal electrode or a transparent conductive film (such as ITO) is substantial, and the eluted substance tends to recrystallize during the process for preparing displays, whereby it becomes difficult to prepare the displays.

In addition to the above requirements, the following two points have been additionally required along with the trend for large sized displays in recent years.

(1) The above-mentioned code 7059 glass has a density of 2.76 g/cc, and a glass having a smaller density is required to meet a requirement for light weight.

(2) The above code 7059 glass has a coefficient of thermal expansion of $46 \times 10^{-7}$/° C., and a glass having a smaller coefficient of thermal expansion is required to increase the rate of temperature increase for the preparation of displays and thus to increase the throughput.

With respect to $B_2O_3$, JP-A-1-160844 discloses a glass product containing from 20 to 23 cation % of $B_2O_3$, but the amount of $B_2O_3$ is so large that the strain point is not sufficiently high. JP-A-61-281041 discloses a product containing from 0.1 to 4 wt % of $B_2O_3$, JP-A-4-175242 discloses a product containing from 0.1 to 5 mol % of $B_2O_3$, and JP-A-4-325435 discloses a product containing from 0 to 3 wt % of $B_2O_3$. However, in each of them, the amount of $B_2O_3$ is so small that the durability against BHF is not sufficient.

With respect to BaO, JP-A-4-325434 discloses a glass product containing from 10 to 20 wt % of BaO, JP-A-63-74935 discloses a product containing from 10 to 22 wt % of BaO, and JP-A-59-169953 discloses a product containing from 15 to 40 wt % of BaO. However, in each of them, BaO is so large that the coefficient of thermal expansion is large, and the density is high.

With respect to MgO, JP-A-61-132536 discloses a glass product containing from 6.5 to 12 wt % of MgO, JP-A-59-116147 discloses a product containing from 5 to 15 wt % of MgO, JP-A-60-71540 discloses a product containing from 5 to 17 wt % of MgO, and JP-A-60-42246 discloses a product containing from 10 to 25 mol % of MgO. However, such glass containing a large amount of MgO tends to undergo phase separation.

With respect to CaO, JP-A-63-176332 discloses a glass product containing from 11 to 25 wt % of CaO, JP-A-58-32038 discloses a product containing from 7 to 20 mol % of CaO, JP-A-2-133334 discloses a product containing from 8 to 15 wt % of CaO, JP-A-3-174336 discloses a product containing from 7 to 12 wt % of CaO, JP-A-6-40739 discloses a product containing from 10 to 12 wt % of CaO, and JP-A-5-201744 discloses a product containing at least 18 cation % of CaO. However, if CaO is contained in a large amount, the coefficient of thermal expansion tends to be too large.

With respect to $Al_2O_3$, JP-A-61-236631 discloses a glass product containing from 22.5 to 35 wt % of $Al_2O_3$, but the amount of $Al_2O_3$ is so large that elution to a chemical reagent such as hydrochloric acid is substantial.

With respect to $P_2O_5$, JP-A-61-261232 and JP-A-63-11543 disclose those containing $P_2O_5$. However, they are not desirable, since they tend to deteriorate the semiconductor properties of thin films.

Further, glass having a strain point of at least 640° C. and a relatively small coefficient of thermal expansion is disclosed in JP-A-4-160030 or JP-A-6-263473. However, such glass contains a substantial amount of BaO as an essential element, whereby it is difficult to satisfy the requirements for low density and small thermal expansion coefficient simultaneously. Accordingly, it does not fully satisfy the demand of the age for large sized panels.

It is an object of the present invention to solve the above drawbacks and to provide alkali-free glasses which have strain points of at least 640° C. and small coefficients of thermal expansion and small densities and are free from forming of turbidity by BHF and which are excellent in the durability against reagents such as hydrochloric acid, are easy to melt and shape and can be formed by float process.

SUMMARY OF THE INVENTION

The present invention provides an alkali-free glass consisting essentially of, by wt %, from 58.4 to 66.0% of $SiO_2$, from 15.3 to 22.0% of $Al_2O_3$, from 5.0 to 12.0% of $B_2O_3$, from 0 to 8.0% of MgO, from 0 to 9.0% of CaO, from 3.0 to 12.5% of SrO, from 0 to less than 2.0% of BaO, and from 9.0 to 18.0% of MgO+CaO+SrO+BaO and having a strain point of at least 640° C.

Also, the present invention provides an alkali-free glass consisting essentially of, by wt %, from 58.4 to 66.0% of $SiO_2$, from 15.3 to 22.0% of $Al_2O_3$, from 5.0 to 12.0% of $B_2O_3$, from 0 to 6.5% of MgO, from 0 to 7.0% of CaO, from 4.0 to 12.5% of SrO, from 0 to less than 2.0% of BaO, and from 9.0 to 18.0% of MgO+CaO+SrO+BaO and having a strain point of at least 640° C.

DETAILED DESCRIPTION OF THE PREFERRED EMBODIMENTS

The alkali-free glasses of the present invention are essentially free from alkali metal oxides (such as $Na_2O$ or $K_2O$). Specifically, the total amount of alkali metal oxides is preferably not higher than 0.5 wt %, more preferably not higher than 0.2 wt %.

Now, the reasons for defining the compositional ranges of the respective components as mentioned above, will be described.

If the content of $SiO_2$ is too small, it tends to be difficult to increase the strain point sufficiently, and the chemical durability tends to deteriorate and the coefficient of thermal expansion tends to increase. Preferably, it is at least 59.0 wt %. If it is too large, the melting property tends to be poor, and the liquidus temperature tends to increase. Preferably, it is at most 65.0 wt %, more preferably at most 62.7 wt %.

$Al_2O_3$ suppresses phase separation of glass, reduces the coefficient of thermal expansion and increases the strain point. If its content is too small, no adequate effects can be obtained. Preferably, it is at least 15.3 wt %. If it is too large, the melting property of glass tends to be poor. Preferably, it is at most 21.1 wt %.

$B_2O_3$ serves to prevent formation of turbidity by BHF and is effective to lower the coefficient of thermal expansion and the density without increasing the viscosity at a high temperature. If its content is too small, the BHF property tends to deteriorate. Preferably, it is at least 5.2 wt %. If it is too large, the acid resistance tends to deteriorate, and the strain point tends to be low. Preferably, it is at most 10.2 wt %.

MgO is not essential but may be contained, as it lowers the coefficient of thermal expansion without lowering the strain point, among alkaline earth metal oxides. If its content it too large, turbidity by BHF or phase separation of glass tends to occur. Preferably, it is at most 7.0 wt %, preferably at most 6.5 wt %, more preferably at most 6.0 wt %, most preferably at most 3.1 wt %.

CaO is not essential, but by its incorporation, it is possible to improve the melting property of glass. On the other hand, if it is too much, coefficient of thermal expansion tends to be large, and the liquidus temperature tends to be high. Preferably, it is at most 8.0 wt %, more preferably at most 7.0 wt %, most preferably at most 6.6 wt %.

SrO is essential since it serves to suppress phase separation of glass and is a relatively useful component against turbidity by BHF. Preferably, it is at least 3.5 wt %, more preferably at least 4.0 wt %, most preferably at least 4.6 wt %. If the content is too large, the coefficient of thermal expansion tends to increase. Preferably, it is at most 12.1 wt %.

BaO is a component which is effective for suppressing phase separation of glass, for improving the melting property and for suppressing the liquidus temperature. However, if its content is too large, the density tends to be high, and the coefficient of thermal expansion tends to increase. With a view to reducing the density and the coefficient of thermal expansion, its content is preferably not higher than 1.8 wt %, more preferably, it is not (substantially) contained beyond the amount contained as an impurity.

If the total amount of MgO+CaO+SrO+BaO is too small, the melting tends to be difficult. If it is too large, the density tends to be high. Preferably, it is at most 17.4 wt %.

In recent years, TFT of polysilicon type has been proposed and employed against TFT of amorphous silicon type which has already been commercialized and used for liquid crystal display devices. TFT of polysilicon type has merits such that (1) since the mobility of transistor can be increased, the control time per pixel can be shortened, whereby high precision of LCD can be accomplished, (2) it becomes possible to mount driving ICs along the periphery of the picture surface. On the other hand, however, intensive heat treatment (such as at a temperature of from 500 to 600° C. for few hours) is required in the process for its preparation. At such a high temperature, impurities in glass tend to diffuse into TFT to increase leak current, deteriorate TFT characteristics and make it difficult to prepare high precision TFT. The most problematic among such impurities is phosphorus. Therefore, in the present invention, P is preferably controlled to be at most 20 atomic (cation) ppm, since it tends to bring about a drawback that phosphorus diffuses into TFT by the heat treatment to increase leak current and deteriorate the TFT characteristics.

In the glass of the present invention, in addition to the above components, ZnO, $SO_3$, F, Cl and $SnO_2$ may be incorporated in a total amount of at most 5 mol %, in order to improve the melting property, the clarity and the forming property of the glass.

Further, if PbO, $As_2O_3$ or $Sb_2O_3$ is contained, a number of steps will be required for treatment of glass cullet. Therefore, it is preferred that no such a component is incorporated except for an amount unavoidably included as an impurity.

Thus, a glass composition according to a preferred embodiment of the present invention consists essentially of, by wt %, from 59.0 to 62.7% of $SiO_2$, from 15.3 to 21.1% of $Al_2O_3$, from 5.2 to 10.2% of $B_2O_3$, from 0 to 6.0% of MgO, from 0 to 6.6% of CaO, from 4.6 to 12.1% of SrO, and from 10.9 to 17.4% of MgO+CaO+SrO+BaO.

A glass composition according to another preferred embodiment of the present invention consists essentially of, by wt %, from 59.0 to 62.7% of $SiO_2$, from 15.3 to 21.1% of $Al_2O_3$, from 5.2 to 10.2% of $B_2O_3$, from 0 to 9% of MgO, from 0 to 8% of CaO, from 3.0 to 6.0% of SrO and from 10.9 to 17.4% of MgO+CaO+SrO+BaO.

The glass of the present invention has a strain point of at least 640° C. The strain point is preferably at least 650° C. The coefficient of thermal expansion is preferably less than $40\times10^{-7}/°$ C., more preferably at least $27\times10^{-7}/°$ C. and less than $40\times10^{-7}/°$ C., most preferably at least $30\times10^{-7}/°$ C. and less than $40\times10^{-7}/°$ C. The density is preferably less than 2.60 g/cc, more preferably less than 2.55 g/cc, most preferably less than 2.50 g/cc, particularly less than 2.45 g/cc.

In order to make a density lower than 2.40 g/cc, there is provided preferably an alkali-free glass consisting essentially of, by wt %, from 58.4 to 66.0% of $SiO_2$, from 15.3 to 22.0% of $Al_2O_3$, from 5.0 to 12.0% of $B_2O_3$, from more than 6.5 to 8.0% of MgO, from 0 to 9.0% of CaO, from 3.0 to less than 4.0% of SrO and from 9.0 to 18.0% of MgO+CaO+SrO+BaO, and having a strain point of at least 640° C. The amount of MgO is more preferably from 6.6 to 7.5% and the amount of CaO is more preferable from 0 to 2.5%.

Also, the glass of the present invention is suitable to be used for various display substrates and photomask substrates, and usually there are conveying steps in the production processes of various displays and photomasks. If these substrates are bent down by their own weights during the production processes, unpreferable production troubles are sometimes caused. In order to make this bending small, it is favorable to use a glass having a large Young's modulus. Thus, it is preferable to make the Young's modulus of the glass of the present invention at least 7,400 kgf/mm$^2$, preferably 7,500 kgf/mm$^2$.

In order to make the Young's modulus at least 7,400 kgf/mm$^2$, there is provided preferably an alkali-free glass consisting essentially of, by weight, from 58.4 to 66.0% of $SiO_2$, from 15.3 to 22.0% of $Al_2O_3$, from 5.0 to 12.0% of $B_2O_3$, from 0 to 8.0% of MgO, from more than 7.0 to 9.0% of CaO, from 3.0 to 12.5% of SrO, from 0 to less than 2.0% of BaO and from 9.0 to 18.0% of MgO+CaO+SrO+BaO.

Further, the glass of the present invention is suitable for forming by a float process, since the forming temperature (the temperature at which the viscosity becomes $10^4$ poise) in the float process forming is not lower than the liquidus temperature.

The glass of the present invention can be prepared, for example, by the following method. Namely, raw materials of the respective components which are commonly used, are blended to obtain a desired composition, which is continuously introduced into a melting furnace, and melted at a temperature of from 1500 to 1600° C. This molten glass is formed into a sheet having a predetermined thickness by a float process, and the sheet is annealed and then cut. A glass sheet thus obtained may be used as one of the pair of substrates constituting a cell for flat panel displays.

Now, the present invention will be described in further detail with reference to Examples. However, it should be understood that the present invention is by no means restricted by such specific Examples.

EXAMPLES 1 to 46

Raw materials for the respective components were mixed to have the desired composition and melted at a temperature of from 1500 to 1600° C. by means of a platinum crucible. During the melting, a platinum stirrer was used for stirring to homogenize the glass. Then, the molten glass was cast and formed into a sheet, followed by annealing.

In Tables 1 to 5, the glass compositions thus obtained as well as the coefficients of thermal expansion, high temperature viscosities, liquidus temperatures, strain points, densities, acid resistance, BHF resistance, and Young's modulus are shown. Tables 6 to 11 show the compositions of Tables 1 to 5 by mol %. Examples 1 to 41 are Examples of the present invention, and Examples 42 to 45 are Comparative Examples. In Examples 39 to 43, the content of phosphorus (atomic weight ppm) and the leak current representing the TFT characteristics are also given.

The coefficient of thermal expansion is represented by a unit of $10^{-7}$/° C. The high temperature viscosity is represented by a temperature (unit: ° C.) at which the viscosity became $10^2$ or $10^4$ poise. The liquidus temperature and the strain point are represented by a unit of ° C., and the density is represented by a unit of g/cc. The strain point was measured in accordance with JIS R3103.

The acid resistance is represented by the weight loss per unit area (unit: mg/cm$^2$) after immersion for 20 hours in 0.1N HCl at 90° C. The acid resistance is preferably not more than 0.3 mg/cm$^2$, more preferably not more than 0.2 mg/cm$^2$.

The BHF resistance is represented by the weight loss per unit area (unit: mg/cm$^2$) after immersion in a $NH_4F$/HF mixed solution (a solution having a 40 wt % $NH_4F$ aqueous solution and 50 wt % of HF aqueous solution mixed in a volume ratio of 9:1) at 25° C. for 20 minutes. The BHF resistance is preferably not more than 0.7 mg/cm$^2$, more preferably not more than 0.6 mg/cm$^2$.

With respect to the leak current, polysilicon type TFT with an electrode length of 10 μm was formed on a glass substrate, and the leak current (unit; pA) was measured at a gate voltage of −5V, a source voltage of 0V and a drain voltage of +10V. The leak current is preferably not more than about 50 pA.

Young's modulus (unit; kgf/mm$^2$) was measured in accordance with ASTM C1198.

Glasses of Examples 1 to 41 show a low coefficient of thermal expansion of from 27×10$^{-7}$ to less than 40×10$^{-7}$/° C. and a high strain point of at least 640° C. and thus adequately durable against heat treatment at a high temperature. Their densities are less than 2.60 g/cc and far less than 2.76 g/cc of Corning code 7059 glass. Also with respect to the chemical characteristics, turbidity scarcely forms by BHF, and they are excellent also in the acid resistance. The temperature corresponding to $10^2$ poise which is an index of meltability, is relatively low, thus indicating that the melting is easy, and the temperature corresponding to $10^4$ poise which is an index for the forming property, is at least the liquidus temperature, thus indicating no possibility of a trouble such as devitrification during the forming.

On the other hand, in Examples 44 and 45 wherein the compositions are outside the scope of the present invention, the coefficients of thermal expansion are large, and the densities are relatively large. In Examples 42, the content of phosphorus is large, whereby the leak current is substantial.

Example 46 illustrates a glass of the present invention having a relatively small Young's modulus, wherein the amount of CaO is at most 7.0 wt %.

The glass of the present invention can be formed by float process, and it is resistant against formation of turbidity by BHF and has excellent acid resistance, high heat resistance and a low coefficient of thermal expansion. Therefore, it is suitable for display substrates or photomasks substrates. Since the density is very low, it is particularly suitable for e.g. large size TFT type display substrates.

TABLE 1

| Example No. | 1 | 2 | 3 | 4 | 5 | 6 | 7 | 8 | 9 |
|---|---|---|---|---|---|---|---|---|---|
| $SiO_2$ wt % | 60.8 | 60.3 | 59.0 | 60.5 | 59.5 | 62.7 | 59.7 | 58.4 | 58.6 |
| $Al_2O_3$ | 16.7 | 16.3 | 19.4 | 15.6 | 16.3 | 17.0 | 18.2 | 21.0 | 16.6 |
| $B_2O_3$ | 8.3 | 8.1 | 6.2 | 8.5 | 8.1 | 9.5 | 9.3 | 9.2 | 9.3 |
| MgO | 1.2 | 0.0 | 0.6 | 3.1 | 0.0 | 2.4 | 2.4 | 1.2 | 0.6 |
| CaO | 4.6 | 3.3 | 4.5 | 6.0 | 4.9 | 3.0 | 2.9 | 4.1 | 5.8 |
| SrO | 8.5 | 12.1 | 8.3 | 6.3 | 9.4 | 5.5 | 5.7 | 6.1 | 9.2 |
| BaO | 0.0 | 0.0 | 0.0 | 0.0 | 1.8 | 0.0 | 1.8 | 0.0 | 0.0 |
| MgO + CaO + SrO + BaO | 14.3 | 15.4 | 13.4 | 15.4 | 16.1 | 10.9 | 12.8 | 11.4 | 15.6 |
| Coefficient of thermal expansion | 35 | 37 | 36 | 39 | 39 | 32 | 33 | 33 | 39 |
| High temperature viscosity | | | | | | | | | |
| $10^2$ poise | 1730 | 1750 | 1730 | 1660 | 1730 | 1750 | 1740 | 1710 | 1700 |
| $10^4$ poise | 1340 | 1350 | 1340 | 1260 | 1340 | 1320 | 1310 | 1320 | 1290 |
| Liquidus temperature | 1310 | 1330 | 1310 | 1260 | 1340 | 1300 | 1280 | 1320 | 1250 |
| Strain point | 660 | 660 | 670 | 640 | 655 | 670 | 670 | 680 | 640 |
| Density | 2.48 | 2.49 | 2.48 | 2.50 | 2.53 | 2.40 | 2.46 | 2.44 | 2.52 |
| Acid resistance | 0.10 | 0.07 | 0.15 | 0.13 | 0.11 | 0.12 | 0.15 | 0.20 | 0.13 |
| BHF resistance | 0.48 | 0.47 | 0.47 | 0.50 | 0.50 | 0.48 | 0.51 | 0.53 | 0.50 |

TABLE 2

| Example No. | 10 | 11 | 12 | 13 | 14 | 15 | 16 | 17 | 18 |
|---|---|---|---|---|---|---|---|---|---|
| $SiO_2$ wt % | 60.0 | 62.6 | 60.7 | 61.4 | 60.9 | 59.1 | 58.7 | 61.4 | 61.5 |
| $Al_2O_3$ | 18.0 | 16.9 | 18.2 | 15.3 | 16.7 | 19.5 | 21.1 | 18.1 | 16.6 |
| $B_2O_3$ | 10.2 | 7.4 | 7.2 | 7.3 | 6.2 | 6.1 | 6.2 | 5.2 | 8.3 |
| MgO | 0.0 | 2.6 | 1.6 | 1.5 | 1.8 | 1.2 | 1.2 | 1.2 | 1.2 |
| CaO | 4.1 | 3.7 | 4.3 | 5.9 | 5.0 | 4.9 | 6.6 | 5.0 | 3.8 |
| SrO | 7.6 | 6.8 | 8.0 | 8.6 | 9.3 | 9.1 | 6.1 | 9.2 | 7.7 |
| BaO | 0.0 | 0.0 | 0.0 | 0.0 | 0.0 | 0.0 | 0.0 | 0.0 | 0.9 |
| MgO + CaO + SrO + BaO | 11.7 | 13.1 | 13.9 | 16.0 | 16.1 | 15.2 | 13.9 | 15.4 | 13.6 |
| Coefficient of thermal expansion | 33 | 33 | 35 | 39 | 38 | 37 | 37 | 37 | 35 |
| High temperature viscosity | | | | | | | | | |
| $10^2$ poise | 1740 | 1730 | 1710 | 1700 | 1720 | 1750 | 1750 | 1770 | 1740 |
| $10^4$ poise | 1340 | 1340 | 1340 | 1320 | 1310 | 1320 | 1320 | 1340 | 1330 |
| Liquidus temperature | 1300 | 1340 | 1320 | 1320 | 1300 | 1300 | 1300 | 1340 | 1300 |
| Strain point | 640 | 680 | 680 | 665 | 685 | 695 | 700 | 710 | 670 |
| Density | 2.44 | 2.46 | 2.48 | 2.52 | 2.53 | 2.52 | 2.50 | 2.52 | 2.47 |
| Acid resistance | 0.28 | 0.07 | 0.09 | 0.06 | 0.06 | 0.06 | 0.06 | 0.05 | 0.12 |
| BHF resistance | 0.47 | 0.52 | 0.53 | 0.56 | 0.54 | 0.56 | 0.57 | 0.59 | 0.44 |

TABLE 3

| Example No. | 19 | 20 | 21 | 22 | 23 | 24 | 25 | 26 | 27 |
|---|---|---|---|---|---|---|---|---|---|
| $SiO_2$ wt % | 61.1 | 62.1 | 60.0 | 61.3 | 59.7 | 62.9 | 63.0 | 60.5 | 60.1 |
| $Al_2O_3$ | 19.8 | 18.1 | 16.5 | 16.8 | 20.0 | 15.7 | 17.3 | 18.7 | 17.0 |
| $B_2O_3$ | 7.3 | 9.2 | 6.1 | 7.3 | 7.3 | 7.5 | 7.5 | 7.4 | 7.4 |
| MgO | 2.4 | 0.6 | 1.2 | 3.6 | 4.2 | 5.0 | 5.6 | 6.2 | 3.9 |
| CaO | 3.9 | 3.0 | 4.6 | 1.7 | 2.5 | 2.6 | 1.7 | 0.9 | 4.1 |
| SrO | 4.6 | 6.1 | 10.7 | 9.3 | 6.2 | 6.4 | 4.8 | 6.3 | 7.5 |
| BaO | 0.9 | 0.9 | 0.9 | 0.0 | 0.0 | 0.0 | 0.0 | 0.0 | 0.0 |
| MgO + CaO + SrO + BaO | 11.8 | 10.6 | 17.4 | 14.6 | 12.9 | 14.0 | 12.1 | 13.4 | 15.5 |
| Coefficient of thermal expansion | 32 | 31 | 39 | 35 | 33 | 35 | 32 | 33 | 38 |
| High temperature viscosity | | | | | | | | | |
| $10^2$ poise | 1720 | 1780 | 1720 | 1690 | 1640 | 1680 | 1660 | 1630 | 1650 |
| $10^4$ poise | 1340 | 1350 | 1310 | 1310 | 1280 | 1290 | 1290 | 1270 | 1270 |
| Liquidus temperature | 1280 | 1300 | 1300 | 1300 | 1280 | 1290 | 1290 | 1270 | 1250 |
| Strain point | 685 | 675 | 670 | 680 | 690 | 690 | 700 | 700 | 660 |
| Density | 2.45 | 2.41 | 2.56 | 2.50 | 2.49 | 2.47 | 2.45 | 2.49 | 2.51 |
| Acid resistance | 0.07 | 0.14 | 0.06 | 0.08 | 0.04 | 0.12 | 0.17 | 0.11 | <0.1 |
| BHF resistance | 0.54 | 0.46 | 0.55 | 0.46 | 0.48 | 0.42 | 0.37 | 0.40 | 0.54 |

TABLE 4

| Example No. | 28 | 29 | 30 | 31 | 32 | 33 | 34 | 35 | 36 | 37 | 38 |
|---|---|---|---|---|---|---|---|---|---|---|---|
| $SiO_2$ wt % | 62.0 | 61.3 | 63.5 | 65.4 | 63.5 | 61.3 | 60.3 | 59.3 | 59.7 | 58.7 | 61.1 |
| $Al_2O_3$ | 17.3 | 16.6 | 17.4 | 16.1 | 13.9 | 17.1 | 16.6 | 17.8 | 18.7 | 16.4 | 18.6 |
| $B_2O_3$ | 8.6 | 7.4 | 7.6 | 7.7 | 7.4 | 8.5 | 8.3 | 6.1 | 9.6 | 8.1 | 7.4 |
| MgO | 3.7 | 1.8 | 5.6 | 7.6 | 4.3 | 5.7 | 3.6 | 1.8 | 5.5 | 2.8 | 0.9 |
| CaO | 5.2 | 7.7 | 2.6 | 0.0 | 0.0 | 0.0 | 1.7 | 1.6 | 1.7 | 0.0 | 8.9 |
| SrO | 3.2 | 3.2 | 3.2 | 3.3 | 11.0 | 7.4 | 9.3 | 13.5 | 4.8 | 14.1 | 3.1 |
| BaO | 0.0 | 0.0 | 0.0 | 0.0 | 0.0 | 0.0 | 0.0 | 0.0 | 0.0 | 0.0 | 0.0 |
| MgO + CaO + SrO + BaO | 12.1 | 12.7 | 11.5 | 10.9 | 15.2 | 13.1 | 14.6 | 16.9 | 12.0 | 16.8 | 13.0 |
| Coefficient of thermal expansion | 33 | 36 | 31 | 28 | 34 | 31 | 34 | 37 | 31 | 36 | 37 |
| High temperature viscosity | | | | | | | | | | | |
| $10^2$ poise | 1710 | 1720 | 1710 | 1720 | 1720 | 1680 | 1680 | 1680 | 1660 | 1660 | 1720 |
| $10^4$ poise | 1270 | 1290 | 1280 | 1280 | 1330 | 1280 | 1300 | 1360 | 1240 | 1330 | 1300 |
| Liquidus temperature | 1250 | 1290 | 1280 | 1280 | 1290 | 1270 | 1280 | 1340 | 1240 | 1320 | 1280 |
| Strain point | 670 | 680 | 680 | 680 | 670 | 670 | 670 | 680 | 660 | 660 | 680 |
| Density | 2.43 | 2.46 | 2.41 | 2.38 | 2.48 | 2.44 | 2.48 | 2.54 | 2.43 | 2.53 | 2.48 |
| Acid resistance | 0.10 | 0.08 | 0.07 | 0.13 | 0.07 | 0.11 | 0.10 | 0.08 | 0.12 | 0.10 | 0.09 |
| BHF resistance | 0.6 | 0.6 | 0.6 | 0.6 | 0.6 | 0.6 | 0.6 | 0.6 | 0.6 | 0.6 | 0.6 |
| Young's modulus | — | 7500 | — | — | — | — | — | — | — | — | 7700 |

TABLE 5

| Example No. | 39 | 40 | 41 | 42 | 43 | 44 | 45 | 46 |
|---|---|---|---|---|---|---|---|---|
| $SiO_2$ wt % | 60.3 | 61.1 | 62.0 | 63.0 | 59.5 | 57.2 | 58.0 | 61.6 |
| $Al_2O_3$ | 19.3 | 19.5 | 19.8 | 20.2 | 19.0 | 15.9 | 16.2 | 18.7 |
| $B_2O_3$ | 7.1 | 7.2 | 7.3 | 7.4 | 7.0 | 7.9 | 8.0 | 7.4 |
| MgO | 1.2 | 1.2 | 1.2 | 0.0 | 1.2 | 1.1 | 1.2 | 2.8 |
| CaO | 1.6 | 3.3 | 1.6 | 9.4 | 0.0 | 4.0 | 4.0 | 6.3 |
| SrO | 10.5 | 7.6 | 4.6 | 0.0 | 13.4 | 2.9 | 6.0 | 3.2 |
| BaO | 0.0 | 0.0 | 0.0 | 0.0 | 0.0 | 10.9 | 6.6 | 0.0 |
| MgO + CaO + SrO + BaO | 13.3 | 12.1 | 10.9 | 9.4 | 14.6 | 18.9 | 17.8 | 12.6 |
| Content of phosphorus | 4 | 6 | 12 | 22 | 0 | | | |
| Coefficient of thermal expansion | 34 | 33 | 32 | 33 | 34 | 41 | 40 | 34 |
| High temperature viscosity | | | | | | | | |
| $10^2$ poise | 1740 | 1740 | 1750 | 1750 | 1740 | 1690 | 1690 | 1710 |
| $10^4$ poise | 1350 | 1350 | 1350 | 1350 | 1350 | 1290 | 1290 | 1290 |
| Liquidus temperature | 1300 | 1300 | 1300 | 1300 | 1300 | 1250 | 1260 | 1270 |
| Strain point | 690 | 690 | 690 | 690 | 690 | 670 | 670 | 680 |
| Density | 2.47 | 2.45 | 2.42 | 2.40 | 2.49 | 2.60 | 2.57 | 2.47 |
| Acid resistance | 0.05 | 0.05 | 0.05 | 0.05 | 0.05 | 0.08 | 0.06 | 0.09 |
| BHF resistance | 0.54 | 0.54 | 0.53 | 0.52 | 0.55 | 0.55 | 0.53 | 0.6 |
| Leak current | 8 | 15 | 30 | 90 | 2 | | | |
| Youg's modulus | | | | | | | | 7350 |

TABLE 6

| Example No. | 1 | 2 | 3 | 4 | 5 | 6 | 7 | 8 | 9 |
|---|---|---|---|---|---|---|---|---|---|
| $SiO_2$ mol % | 68.0 | 69.0 | 67.0 | 66.0 | 68.0 | 69.0 | 67.0 | 66.0 | 66.0 |
| $Al_2O_3$ | 1.0 | 11.0 | 13.0 | 10.0 | 11.0 | 11.0 | 12.0 | 14.0 | 11.0 |
| $B_2O_3$ | 6.0 | 8.0 | 8.0 | 8.0 | 8.0 | 9.0 | 9.0 | 9.0 | 9.0 |
| MgO | 2.0 | 0.0 | 1.0 | 5.0 | 0.0 | 4.0 | 4.0 | 2.0 | 1.0 |
| CaO | 5.5 | 4.0 | 5.5 | 7.0 | 6.0 | 3.5 | 3.5 | 5.0 | 7.0 |
| SrO | 5.5 | 8.0 | 5.5 | 4.0 | 6.2 | 3.5 | 3.7 | 4.0 | 6.0 |
| BaO | 0.0 | 0.0 | 0.0 | 0.0 | 0.8 | 0.0 | 0.8 | 0.0 | 0.0 |
| MgO + CaO + SrO + BaO | 13.0 | 12.0 | 12.0 | 16.0 | 13.0 | 11.0 | 12.0 | 11.0 | 14.0 |

TABLE 7

| Example No. | 10 | 11 | 12 | 13 | 14 | 15 | 16 | 17 | 18 |
|---|---|---|---|---|---|---|---|---|---|
| $SiO_2$ mol % | 68.0 | 69.0 | 68.0 | 68.0 | 68.0 | 67.0 | 66.0 | 69.0 | 69.0 |
| $Al_2O_3$ | 12.0 | 11.0 | 12.0 | 10.0 | 11.0 | 13.0 | 14.0 | 12.0 | 11.0 |
| $B_2O_3$ | 10.0 | 7.0 | 7.0 | 7.0 | 6.0 | 6.0 | 6.0 | 5.0 | 8.0 |
| MgO | 0.0 | 4.3 | 2.6 | 2.5 | 3.0 | 2.0 | 2.0 | 2.0 | 2.0 |
| CaO | 5.0 | 4.3 | 5.2 | 7.0 | 6.0 | 6.0 | 8.0 | 6.0 | 4.6 |
| SrO | 5.0 | 4.3 | 5.2 | 5.5 | 6.0 | 6.0 | 4.0 | 6.0 | 5.0 |

TABLE 7-continued

| Example No. | 10 | 11 | 12 | 13 | 14 | 15 | 16 | 17 | 18 |
|---|---|---|---|---|---|---|---|---|---|
| BaO | 0.0 | 0.0 | 0.0 | 0.0 | 0.0 | 0.0 | 0.0 | 0.0 | 0.4 |
| MgO + CaO + SrO + BaO | 10.0 | 13.0 | 13.0 | 15.0 | 15.0 | 14.0 | 14.0 | 14.0 | 12.0 |

TABLE 8

| Example No. | 19 | 20 | 21 | 22 | 23 | 24 | 25 | 26 | 27 |
|---|---|---|---|---|---|---|---|---|---|
| $SiO_2$ mol % | 68.0 | 70.0 | 68.0 | 68.0 | 66.0 | 68.0 | 68.0 | 66.0 | 66.0 |
| $Al_2O_3$ | 13.0 | 12.0 | 11.0 | 11.0 | 13.0 | 10.0 | 11.0 | 12.0 | 11.0 |
| $B_2O_3$ | 7.0 | 9.0 | 6.0 | 7.0 | 7.0 | 7.0 | 7.0 | 7.0 | 7.0 |
| MgO | 4.0 | 1.0 | 2.0 | 6.0 | 7.0 | 8.0 | 9.0 | 10.0 | 6.4 |
| CaO | 4.6 | 3.6 | 5.6 | 2.0 | 3.0 | 3.0 | 2.0 | 1.0 | 4.8 |
| SrO | 3.0 | 4.0 | 7.0 | 6.0 | 4.0 | 4.0 | 3.0 | 4.0 | 4.8 |
| BaO | 0.4 | 0.4 | 0.4 | 0.0 | 0.0 | 0.0 | 0.0 | 0.0 | 0.0 |
| MgO + CaO + SrO + BaO | 12.0 | 9.0 | 15.0 | 14.0 | 14.0 | 15.0 | 14.0 | 15.0 | 16.0 |

TABLE 9

| Example No. | 28 | 29 | 30 | 31 | 32 | 33 | 34 | 35 | 36 |
|---|---|---|---|---|---|---|---|---|---|
| $SiO_2$ mol % | 67.0 | 67.0 | 68.0 | 69.0 | 70.0 | 67.0 | 67.0 | 68.0 | 65.0 |
| $Al_2O_3$ | 11.0 | 12.0 | 11.0 | 10.0 | 9.0 | 11.0 | 11.0 | 12.0 | 12.0 |
| $B_2O_3$ | 8.0 | 7.0 | 7.0 | 7.0 | 7.0 | 8.0 | 8.0 | 6.0 | 9.0 |
| MgO | 6.0 | 3.0 | 9.0 | 12.0 | 7.0 | 9.3 | 6.0 | 3.0 | 9.0 |
| CaO | 6.0 | 9.0 | 3.0 | 0.0 | 0.0 | 0.0 | 2.0 | 2.0 | 2.0 |
| SrO | 2.0 | 2.0 | 2.0 | 2.0 | 7.0 | 4.7 | 6.0 | 9.0 | 3.0 |
| BaO | 0.0 | 0.0 | 0.0 | 0.0 | 0.0 | 0.0 | 0.0 | 0.0 | 0.0 |
| MgO + CaO + SrO + BaO | 14.0 | 14.0 | 14.0 | 14.0 | 14.0 | 14.0 | 14.0 | 14.0 | 14.0 |

Table 10

| Example No. | 37 | 38 |
|---|---|---|
| | mol % | |
| $SiO_2$ | 67.0 | 67.0 |
| $Al_2O_3$ | 11.0 | 12.0 |
| $B_2O_3$ | 8.0 | 7.0 |
| MgO | 4.7 | 1.5 |
| CaO | 0.0 | 10.5 |
| SrO | 9.3 | 2.0 |
| BaO | 0.0 | 0.0 |
| MgO + CaO + SrO + BaO | 14.0 | 14.0 |

TABLE 11

| Example No. | 39 | 40 | 41 | 42 | 43 | 44 | 45 | 46 |
|---|---|---|---|---|---|---|---|---|
| $SiO_2$ mol % | 69.0 | 69.0 | 69.0 | 69.0 | 69.0 | 67.0 | 67.0 | 67.0 |
| $Al_2O_3$ | 13.0 | 13.0 | 13.0 | 13.0 | 13.0 | 11.0 | 11.0 | 12.0 |
| $B_2O_3$ | 7.0 | 7.0 | 7.0 | 7.0 | 7.0 | 8.0 | 8.0 | 7.0 |
| MgO | 2.0 | 2.0 | 2.0 | 0.0 | 2.0 | 2.0 | 2.0 | 4.6 |
| CaO | 2.0 | 4.0 | 6.0 | 11.0 | 0.0 | 5.0 | 5.0 | 7.4 |
| SrO | 7.0 | 5.0 | 3.0 | 0.0 | 9.0 | 2.0 | 4.0 | 2.0 |
| BaO | 0.0 | 0.0 | 0.0 | 0.0 | 0.0 | 5.0 | 3.0 | 0.0 |
| MgO + CaO + SrO + BaO | 11.0 | 11.0 | 11.0 | 11.0 | 11.0 | 14.0 | 14.0 | 14.0 |

What is claimed is:

1. An alkali-free glass consisting essentially of, by wt %, from 58.4 to 66.0% of $SiO_2$, from 15.3 to 22.0% of $Al_2O_3$, from 5.0 to 12.0% of $B_2O_3$, from 0 to 8.0% of MgO, from 0 to 9.0% of CaO, from 3.0 to 12.5% of SrO, from 0 to less than 2.0% of BaO, and from 9.0 to 18.0% of MgO+CaO+SrO+BaO and having a strain point of at least 640° C.

2. The alkali-free glass according to claim 1, wherein the amount of MgO is from more than 6.5 to 8.0 wt % and the amount of SrO is from 3.0 to less than 4.0 wt %.

3. The alkali-free glass according to claim 2, which has a density of less than 2.40 g/cc.

4. The alkali-free glass according to claim 1, wherein the amount of CaO is from more than 7.0 to 9.0 wt %.

5. The alkali-free glass according to claim 4, which has a Young's modulus of at least 7,400 kgf/mm$^2$.

6. The alkali-free glass according to claim 1, wherein the amount of MgO is from more than 6.5 to 8.0 wt %, the amount of CaO is from more than 7.0 to 9.0 wt % and the amount of SrO is from 3.0 to less than 4.0 wt %.

7. The alkali-free glass according to claim 6, which has a density of less than 2.40 g/cc and a Young's modulus of at least 7,400 kgf/mm$^2$.

8. The alkali-free glass according to claim 1, which contains substantially no PbO, $As_2O_3$ or $Sb_2O_3$.

9. The alkali-free glass according to claim 1, which has a density of less than 2.60 g/cc.

10. The alkali-free glass according to claim 1, which has a coefficient of thermal expansion of less than $40 \times 10^{-7}$/° C.

11. The alkali-free glass according to claim 1, which is used for a display substrate.

12. A flat panel display comprising a pair of substrates constituting a cell, wherein at least one of the substrates is made of the alkali-free glass as defined in claim 1.

13. An alkali-free glass consisting essentially of, by wt %, from 58.4 to 66.0% of $SiO_2$, from 15.3 to 22.0% of $Al_2O_3$, from 5.0 to 12.0% of $B_2O_3$, from 0 to 6.5% of MgO, from 0 to 7.0% of CaO, from 4.0 to 12.5% of SrO, from 0 to less than 2.0% of BaO, and from 9.0 to 18.0% of MgO+CaO+SrO+BaO and having a strain point of at least 640° C.

14. The alkali-free glass according to claim 13, which contains substantially no PbO, $As_2O_3$ or $Sb_2O_3$.

15. The alkali-free glass according to claim 13, which has a density of less than 2.60 g/cc.

16. The alkali-free glass according to claim 13, which has a coefficient of thermal expansion of less than $40 \times 10^{-7}$/° C.

17. The alkali-free glass according to claim 13, wherein the content of phosphorus is not more than 20 ppm by atomic weight.

18. The alkali-free glass according to claim 13, which is used for a display substrate.

19. A flat panel display comprising a pair of substrates constituting a cell, wherein at least one of the substrates is made of the alkali-free glass as defined in claim 13.

* * * * *